(12) United States Patent
Johnson et al.

(10) Patent No.: US 8,233,406 B1
(45) Date of Patent: Jul. 31, 2012

(54) COMMUNICATION SYSTEM AND METHOD FOR OPERATING A CONTROL DATABASE FOR A WIRELESS COMMUNICATION SYSTEM

(75) Inventors: Harold Wayne Johnson, Roach, MO (US); Timothy D. Euler, Leawood, KS (US); Mohan R. Tammisetti, South Riding, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 937 days.

(21) Appl. No.: 12/265,768

(22) Filed: Nov. 6, 2008

(51) Int. Cl.
 *H04L 12/16* (2006.01)
(52) U.S. Cl. ........ 370/254; 370/315; 370/345; 370/401; 370/522; 455/67.11; 455/507
(58) Field of Classification Search .................. None
See application file for complete search history.

(56) References Cited

U.S. PATENT DOCUMENTS

| | | | |
|---|---|---|---|
| 7,620,370 B2* | 11/2009 | Barak et al. ............... | 455/67.13 |
| 2002/0131376 A1* | 9/2002 | Wheatley et al. ............ | 370/328 |
| 2005/0164664 A1* | 7/2005 | DiFonzo et al. ........... | 455/277.1 |
| 2006/0281494 A1 | 12/2006 | Wilson et al. | |
| 2007/0070957 A1 | 3/2007 | Schwartz | |
| 2007/0218910 A1* | 9/2007 | Hill et al. ...................... | 455/445 |
| 2007/0265013 A1 | 11/2007 | Labedz | |
| 2008/0084858 A1* | 4/2008 | Hart et al. ..................... | 370/342 |
| 2010/0128630 A1* | 5/2010 | Barak et al. ................... | 370/254 |

OTHER PUBLICATIONS

ARRAYCOMM, "A-MAS for WiMAX Infrastructure," 2006, 2 pages, ArrayComm LLC, http://www.arraycomm.com/serve.php?page=WiMAXi.
Vladimir Bykovnikov, "The Advantages of SOFDMA for WiMAX," 2005, 10 pages, Intel Corporation, http://blog.roodo.com/leo5168/bf443aa3.pdf.
CONNIQ.COM, "Introduction to Adaptive Antenna System (AAS)," Nov. 5, 2008, 2 pages, Conniq.com, http://www.conniq.com/WiMAX/aas.htm.
CONNIQ.COM, "Introduction to Multiple Antenna Systems: SIMO, MISO, MIMO, SISO," Nov. 5, 2008, 2 pages, Conniq.com, http://www.conniq.com/WiMAX/mimo-01.htm.
Jeff Orr, "SOMA Networks Licenses ArrayComm Mobile WiMAX Antenna Architecture," Jun. 25, 2007, 4 pages, Mobile Broadband News & ORR Technology, http://mobilebroadbandnews.com/2007/06/25/soma-networks-licenses-arraycomm-mobile-wimax-antenna-architecture/.
WIMAX-INDO.COM, "Adaptive Antenna System (AAS)," Dec. 10, 2007, 4 pages, wimax-indo.com, http://wimax-indo.com/?p=16.

* cited by examiner

*Primary Examiner* — Kevin C Harper

(57) ABSTRACT

A method of operating a control database for a wireless communication system comprises receiving geographic coordinates for a wireless access hub and an identity of a wireless collector hub, retrieving geographic coordinates for the wireless collector hub, identifying a frequency band for wireless communication signals between a core communication network and the wireless collector hub, and identifying reserved time slots in the frequency band. The method also comprises selecting available time slots, processing the geographic coordinates to determine an azimuth and an angle for the wireless access and collector hubs to optimize signal strength, determining a power for the wireless communications signals between the wireless collector and access hubs, receiving a query for the wireless access and collector hubs, and transferring a response indicating the azimuth, the angle, the frequency band, the available time slots, and the power.

20 Claims, 7 Drawing Sheets

COMMUNICATION SYSTEM AND METHOD FOR OPERATING A CONTROL DATABASE FOR A WIRELESS COMMUNICATION SYSTEM

TECHNICAL BACKGROUND

The increase of data and video mobile wireless traffic has increased the demand on wireless communication system's backhaul transport. One way to increase the capability of a wireless communication system's backhaul transport is to utilize an optical fiber transport network. However, creating an optical fiber network includes high construction costs including cable rights-of-way and fiber cable construction, not to mention third part fiber based transport leases. Thus, the owners of wireless communication systems seek to implement low cost bandwidth solutions.

Overview

Generally described, a method of operating a control database for a wireless communication system, wherein wireless users and a wireless access hub will exchange user data over first wireless communication signals, wherein the wireless access hub and a wireless collector hub will exchange the user data over second wireless communication signals, and wherein the wireless collector hub and a core communication network will exchange the user data over third wireless communication signals. In an example, the method comprises receiving first geographic coordinates for the wireless access hub and an identity of the wireless collector hub and, in response, retrieving second geographic coordinates for the wireless collector hub, identifying a frequency band for the third wireless communication signals between the core communication network and the wireless collector hub, and identifying reserved time slots in the frequency band at the wireless collector hub.

Additionally, the method also comprises selecting available time slots in the frequency band at the wireless collector hub for the second wireless communications signals between the wireless collector hub and the wireless access hub, processing the first geographic coordinates and the second geographic coordinates to determine a first azimuth and a first angle for the wireless access hub and a second azimuth and a second angle for the wireless collector hub to optimize signal strength for the second wireless communication signals between the wireless access hub and the wireless collector hub, determining a power for the second wireless communications signals between the wireless collector hub and the wireless access hub based on a distance between the wireless collector hub and the wireless access hub, receiving a first query for the wireless access hub, and in response, transferring a first response indicating the first azimuth, the first angle, the frequency band, the available time slots, and the power, and receiving a second query for the wireless collector hub, and in response, transferring a second response indicating the second azimuth, the second angle, the frequency band, the available time slots, and the power. A wireless communication system for operating a control database is also described.

DETAILED DESCRIPTION

Figure 1:
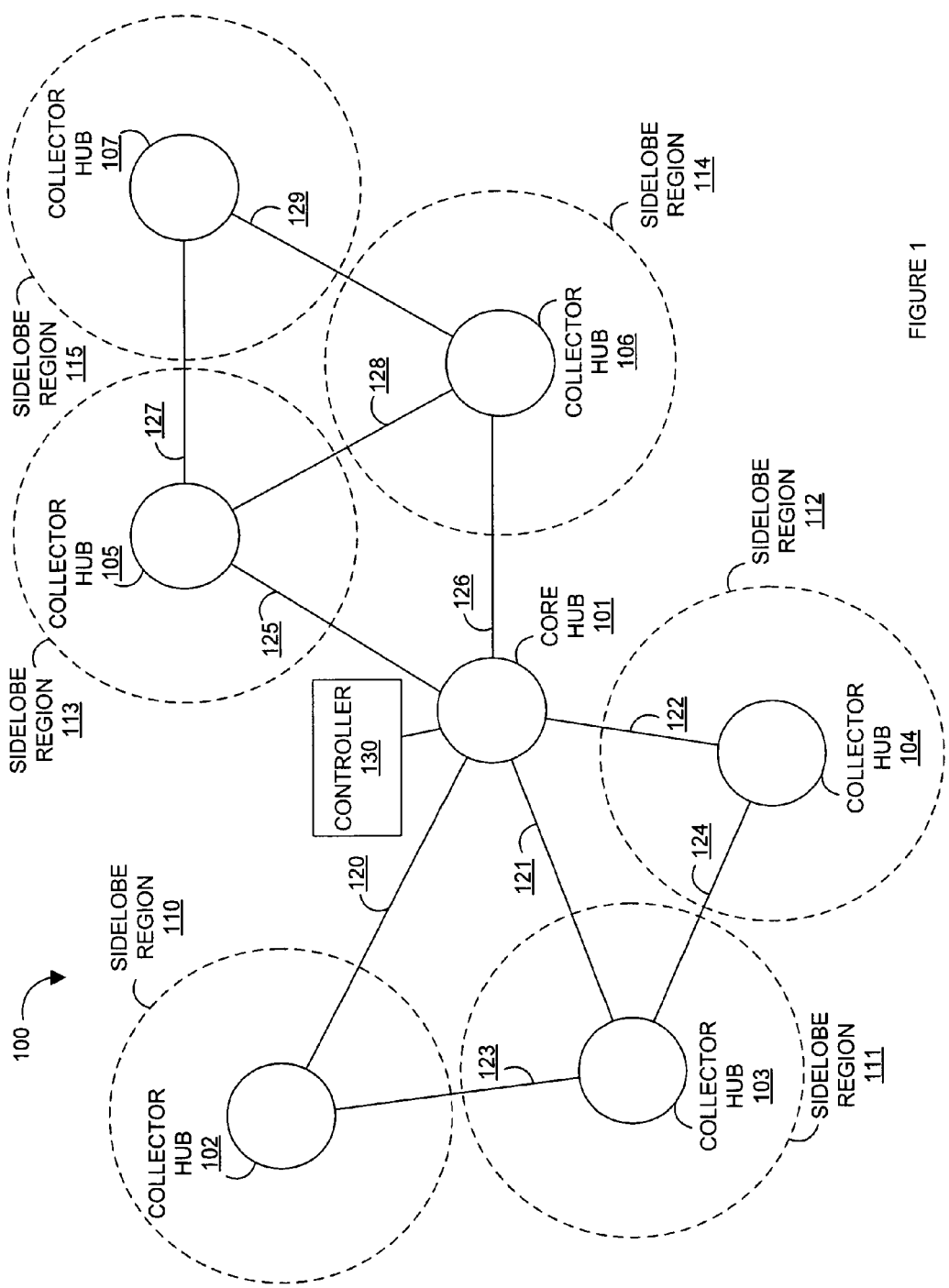
FIG. 1 is a block diagram illustrating communication system 100.

FIG. 1 is a block diagram illustrating communication system 100. Communication system 100 is configured to exchange communication signals between collector hubs 102-107 and core hub 101. Communication system 100 includes core hub 101, collector hubs 102-107, sidelobe regions 110-115, and controller 130.

Core hub 101 comprises antennas and circuitry that communicate with collector hubs 102-107. Additionally, core hub 101 communicates with various other communication systems such as data networks, internet servers, and voice networks. Core hub 101 and collector hub 102 communicate over communication link 120. Core hub 101 and collector hub 103 communicate over communication link 121. Core hub 101 and collector hub 104 communicate over communication link 122. Core hub 101 and collector hub 105 communicate over communication link 125. Core hub 101 and collector hub 106 communicate over communication link 126.

Collector hubs 102-106 comprise antennas and circuitry that communicate with core hub 101. Additionally, collector hub 102 comprises antennas and circuitry that communicate with collector hub 103. Collector hub 103 comprises antennas and circuitry that communicate with collector hub 104. Collector hub 105 comprises antennas and circuitry that communicate with collector hubs 106 and 107. Collector hub 106 comprises antennas and circuitry that communicate with collector hubs 105 and 107. Collector hub 107 comprises antennas and circuitry that communicate with collector hubs 105 and 106. Collector hubs 102-107 also comprise antennas and circuitry that communicate with various access hubs (not shown) within their respective sidelobe region.

Each sidelobe region 110-115 typically comprises multiple access hubs (not shown), although each sidelobe region could comprise a single access hub, that are in communication with collector hubs 102-107, respectively, over wireless communication links (not shown). Communication links 120-129 comprise wireless and/or wired communication links that form a mesh topology within communication system 100. Communication links 120-129 may comprise E-Band links, Common Carrier band links, fiber links, or other types of communication links. Additionally, communication links 120-129 may comprise a combination of E-Band links, Common Carrier band links, and/or fiber links.

Controller 130 comprises circuitry and software that controls communication system 100. For example, controller 130 controls the positioning of antennas within collector hubs 102-107 so as to optimize the signal strength between collector hubs 102-107 and their respective access hubs.

Figure 2:
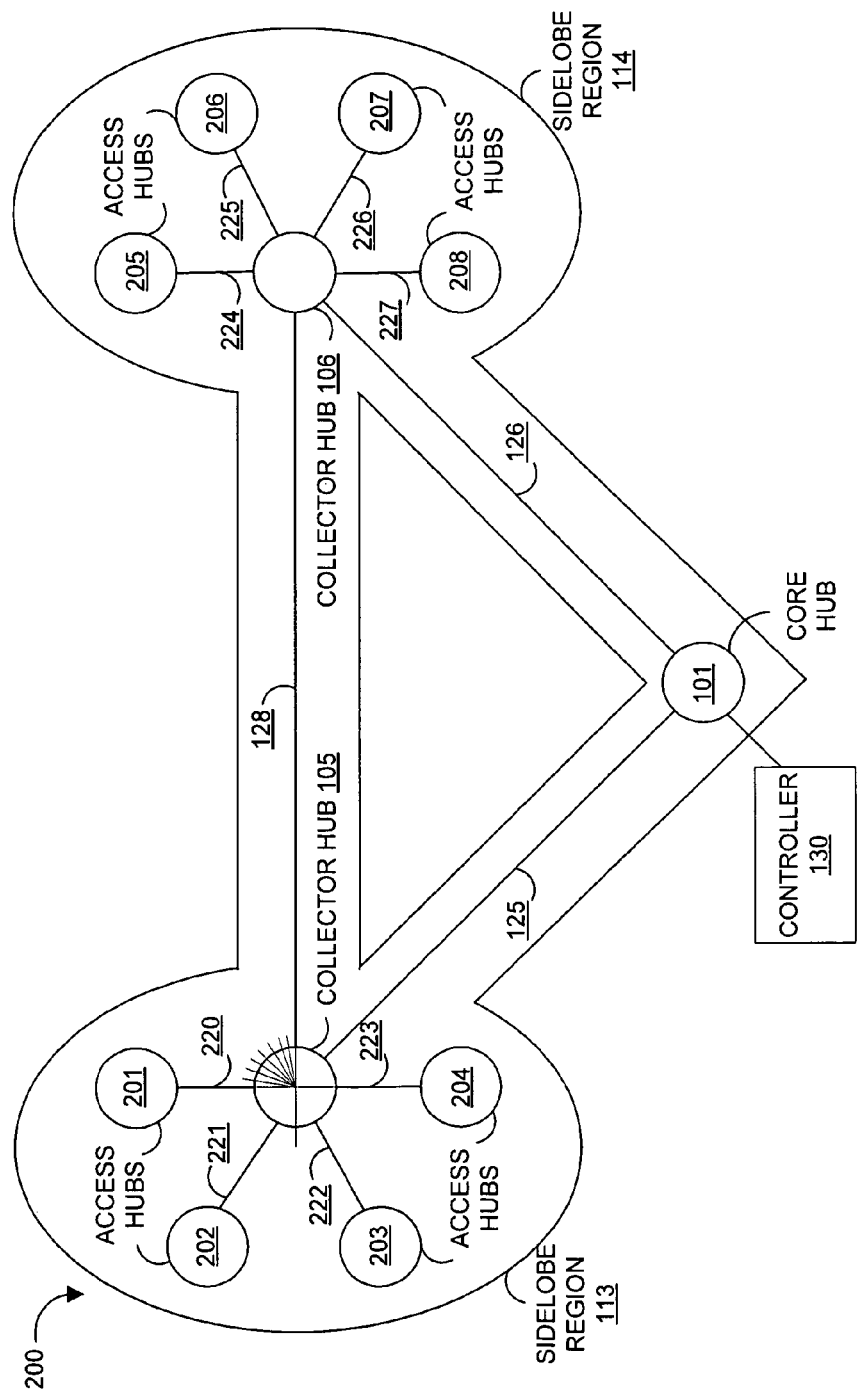
FIG. 2 is a block diagram illustrating communication system 200.

FIG. 2 is a block diagram illustrating communication system 200. Communication system 200 is an enhanced view of core hub 101, collector hub 105, collector hub 106, sidelobe region 113, sidelobe region 114, and controller 130 of communication system 100. Communication system 200 is configured to exchange communication signals between access hubs 201-208 and core hub 101. Communication system 200 is also configured to exchange communication signals between collector hub 105 and collector hub 106. Communication system 200 includes core hub 101, collector hub 105, collector hub 106, sidelobe region 113, sidelobe region 114, access hubs 201-208, and controller 130.

Access hubs 201-204 comprise antennas and circuitry that communicate with collector hub 105. Access hub 201 communicates with collector hub 105 over communication link 220. Access hub 202 communicates with collector hub 105 over communication link 221. Access hub 203 communicates with collector hub 105 over communication link 222. Access hub 204 communicates with collector hub 105 over communication link 223.

Access hubs 205-208 comprise antennas and circuitry that communicate with collector hub 106. Access hub 205 communicates with collector hub 106 over communication link 224. Access hub 206 communicates with collector hub 106 over communication link 225. Access hub 207 communicates with collector hub 106 over communication link 226. Access hub 208 communicates with collector hub 106 over communication link 227.

Communication links 220-227 comprise wireless and/or wired communication links. Communication links 220-227 may comprise Common Carrier band links, fiber links, or other types of communication links. Additionally, communication links 220-227 may comprise a combination of Common Carrier band links and fiber links.

Sidelobe region 113 is created by the combination of point-to-point links from collector hub 105 to access hubs 201-204 and by the area that access hubs 201-204 communicate with user devices (not shown). Collector hub 105 is preferably in communication with access hubs 201-204 over the Common Carrier band with a 4, 6, 10, or 11-12 GHz bandwidth. The radius of sidelobe region 113 is approximately between three to six miles. Moreover, the radius of sidelobe region 113 is determined by the frequency that collector hub 105 communicates with access hubs 201-204, i.e., the lower the frequency the greater the radius.

Sidelobe region 114 is created by the combination of point-to-point links from collector hub 106 to access hubs 205-208 and by the area that access hubs 205-208 can communicate with user devices (not shown). Collector hub 116 is preferably in communication with access hubs 205-208 over the Common Carrier band wherein the Common Carrier band comprises a bandwidth of 4, 6, 10, or 11-12 GHz. Moreover, the radius of sidelobe region 114 is determined by the frequency that collector hub 106 communicates with access hubs 204-208, i.e., the lower the frequency the greater the radius.

Controller 130 comprises circuitry and software that controls communication system 200. For example, controller 130 positions access hub 201 and collector hub 105 so that the signal strength is optimized between the two.

Figure 3:
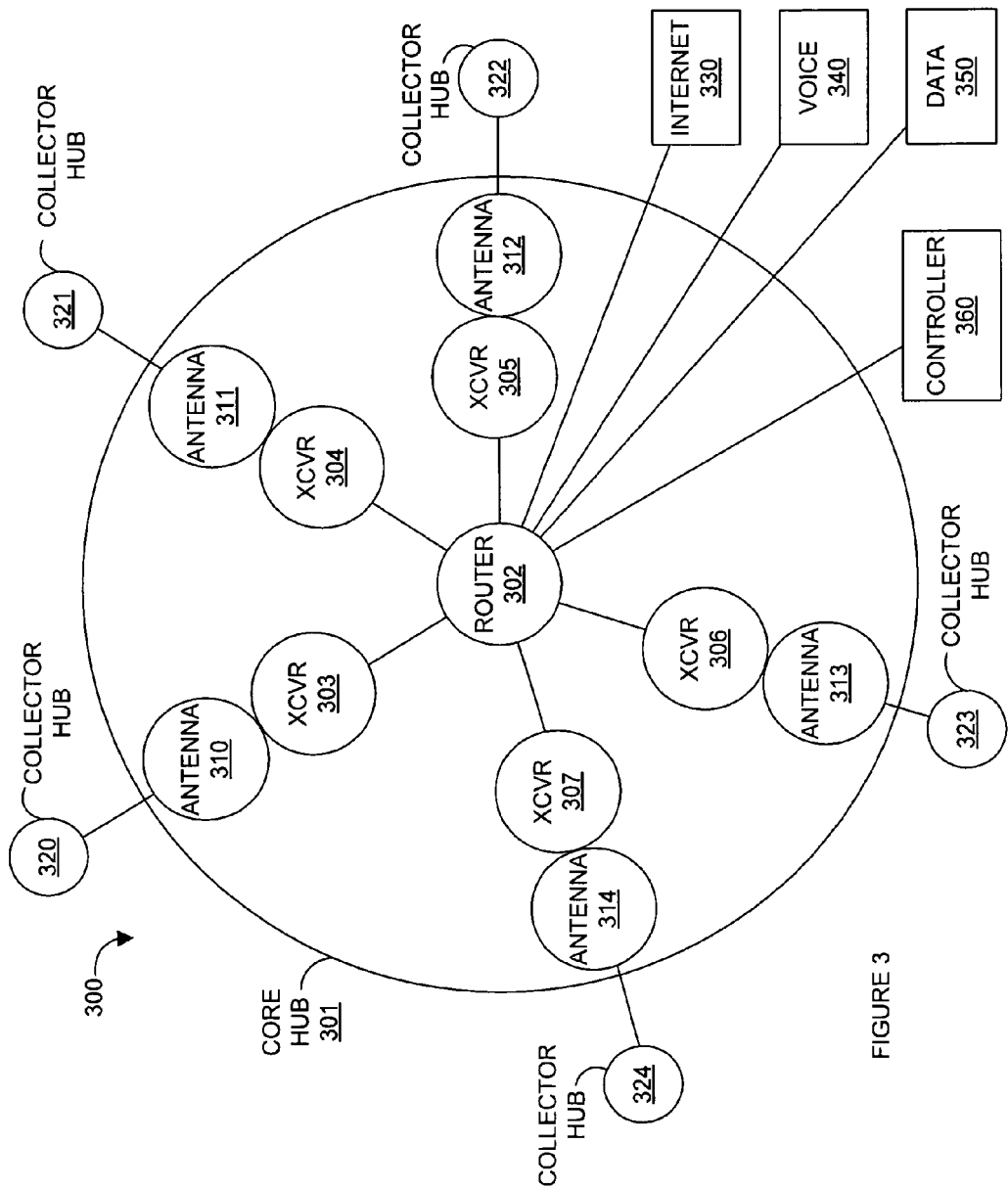
FIG. 3 is a block diagram illustrating communication system 300.

FIG. 3 is a block diagram illustrating communication system 300. Communication system 300 is an example of core hub 101 found in communication systems 100 and 200. Communication system 300 is configured to exchange communication signals between core hub 301 and collector hubs 320-324. Additionally, communication system 300 is configured to exchange communication signals between core hub 301 and internet server 330, voice network 340, and data network 350. Communication system 300 includes core hub 301, collector hubs 320-324, internet server 330, voice network 340, data network 350, and controller 360.

Core hub 301 comprises router 302, transceivers 303-307, and antennas 310-314. Router 302, transceivers 303-307, and antennas 310-314 are connected by electrical circuitry. Router 302 comprises circuitry that directs communications into and out of core hub 301. For example, router 302 directs communications from collector hub 324 to collector hub 322 or router 302 directs communications from collector hub 320 to internet server 330. Transceivers 303-307 comprise circuitry that transmit communication signals to and receive communication signals from collector hubs 320-324. Antennas 310-314 comprise circuitry that transmit and receive communication signals in the form of RF signals to and from collector hubs 320-324. Antennas 310-324 communicate with collector hubs 320-324 over E-Band links, Common Carrier band links, fiber links, or other types or combinations of communication links.

Controller 360 comprises circuitry and software that controls communication system 300. While shown separately, controller 360 may be integrated within core hub 301.

Figure 4:
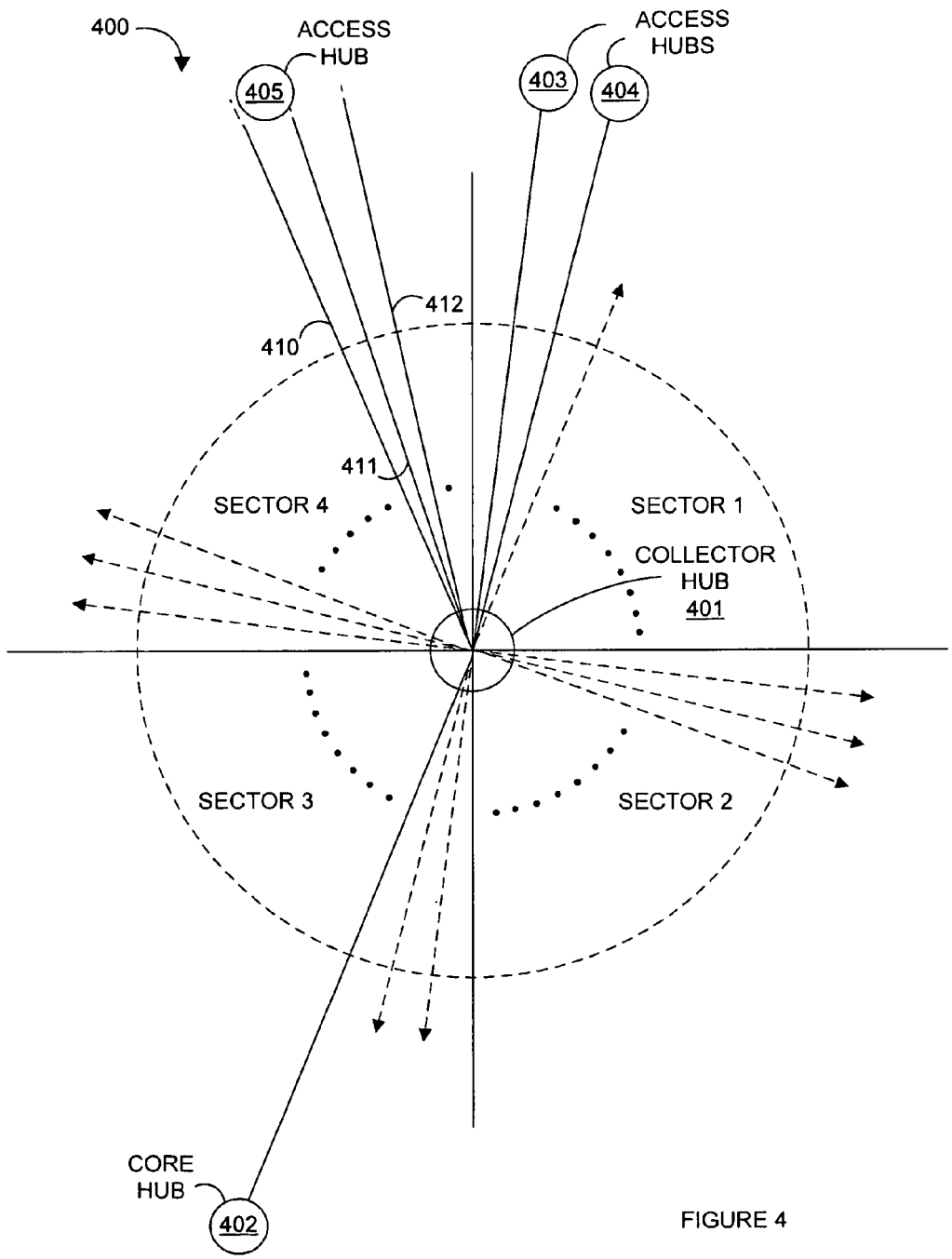
FIG. 4 is a block diagram illustrating communication system 400.

FIG. 4 is a block diagram illustrating communication system 400. Communication system 400 is an example of collector hubs 105 and 106 found in communication systems 100 and 200. Communication system 400 is configured to exchange communication signals between collector hub 401 and access hubs 403-405 as well as between collector hub 401 and core hub 402. Communication system 400 includes collector hub 401, core hub 402, and access hubs 403-405.

Collector hub 401 communicates with access hubs 403-405 and core hub 402 by way of a fixed antenna array (not shown). The antenna array is comprised of multiple antenna elements each of which transmits in a given direction. For example, in FIG. 4 collector hub 401 has an antenna array with 80 different elements whereby each element would be spaced 4.5 degrees apart to provide 360 degree coverage. Moreover, collector hub 401 is divided into 4 different sectors with 20 different frequency channels per sector. In the above example, among adjacent sectors like frequency channels will be spaced as far apart as possible to minimize the amount of interference. Furthermore, Time Division Duplexing would be used to transmit on all frequencies at a Time 1 and receive on all frequencies at a Time 2. Note, the antenna array could have more or less than 80 elements and that more or less than 20 frequency channels could be used.

The antenna array utilizes beamforming to ensure a strong signal connection. Beamforming utilizes interference between consecutive antenna elements in the antenna array to change the directionality of the communication signal. The phase and relative amplitude of adjacent antenna elements are set to create a pattern of constructive or destructive interference in the communication signal. For example, in FIG. 4 access hub 405 does not directly line up with communication signal 411 transmitted from one of collector hub 401's antenna array elements. Thus, the antenna array elements adjacent to the antenna array element that transmits communication signal 411 also transmit communication signals 410 and 412 thereby creating constructive and/or destructive interference that beamforms communication signal 411 toward access hub 405.

Figure 5:
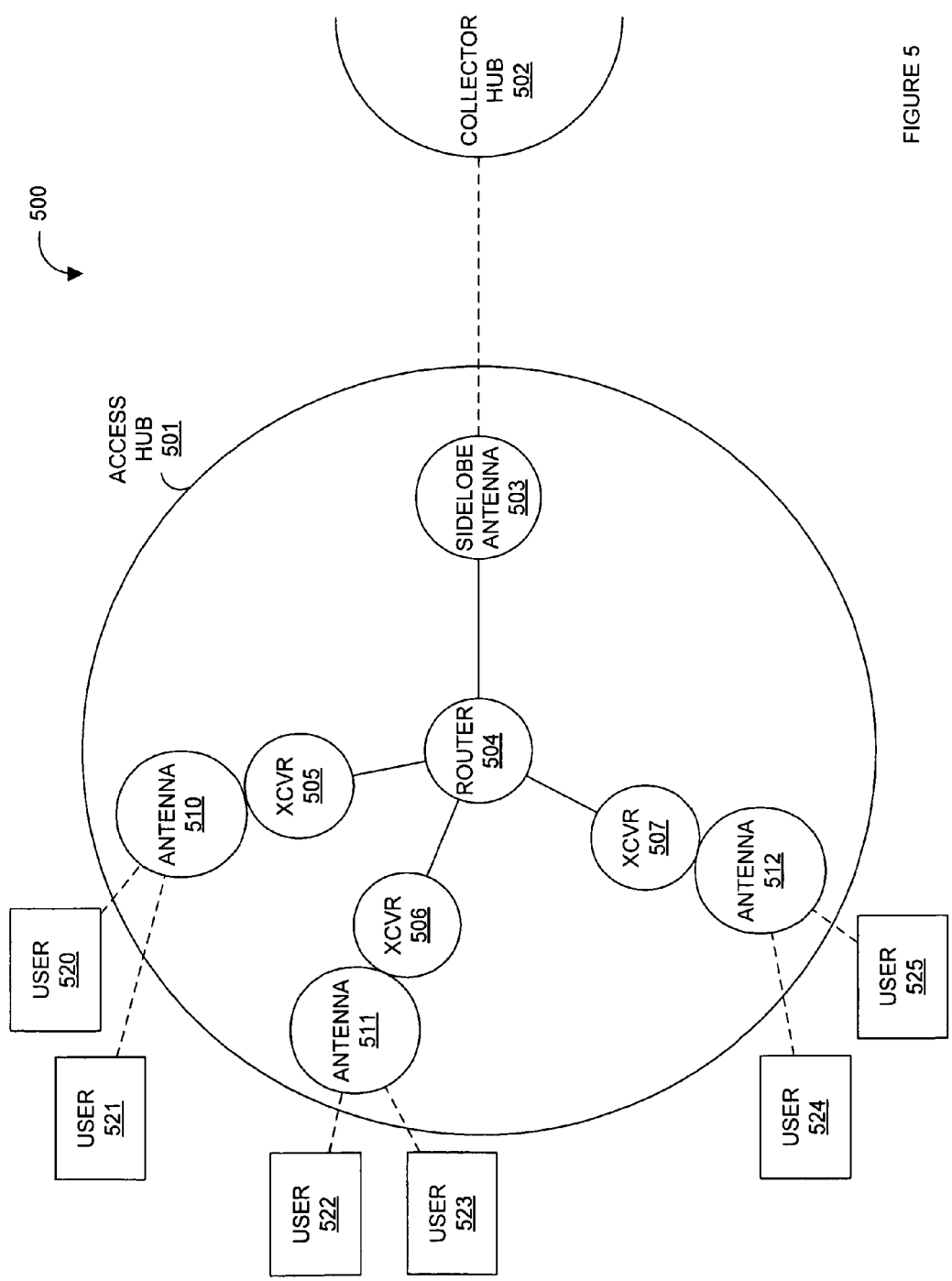
FIG. 5 is a block diagram illustrating communication system 500.

FIG. 5 is a block diagram illustrating communication system 500. Communication system 500 is an example of access hubs 201-208 in communication system 200. Communication system 500 is configured to exchange communication signals between access hub 501 and collector hub 502. Additionally, communication system 500 is configured to exchange communication signals between access hub 501 and users 520-525. Communication system 500 includes access hub 501, collector hub 502, and users 520-525.

Access hub 501 comprises sidelobe antenna 503, router 504, transceivers 505-507, and antennas 510-512. Sidelobe antenna 503 comprises circuitry that transmits and receives communication signals to and from collector hub 502. Sidelobe antenna 503 also communicates with router 504. Router 504 comprises circuitry that directs communications into and out of access hub 501. For example, router 504 directs communications from user 521 to collector hub 502. Transceivers 505-507 comprise circuitry that transmit communication signals to and receive communication signals from users 520-525. Antennas 510-512 comprise circuitry that transmit and receive communication signals in the form of RF signals to and from users 520-525.

Figure 6:
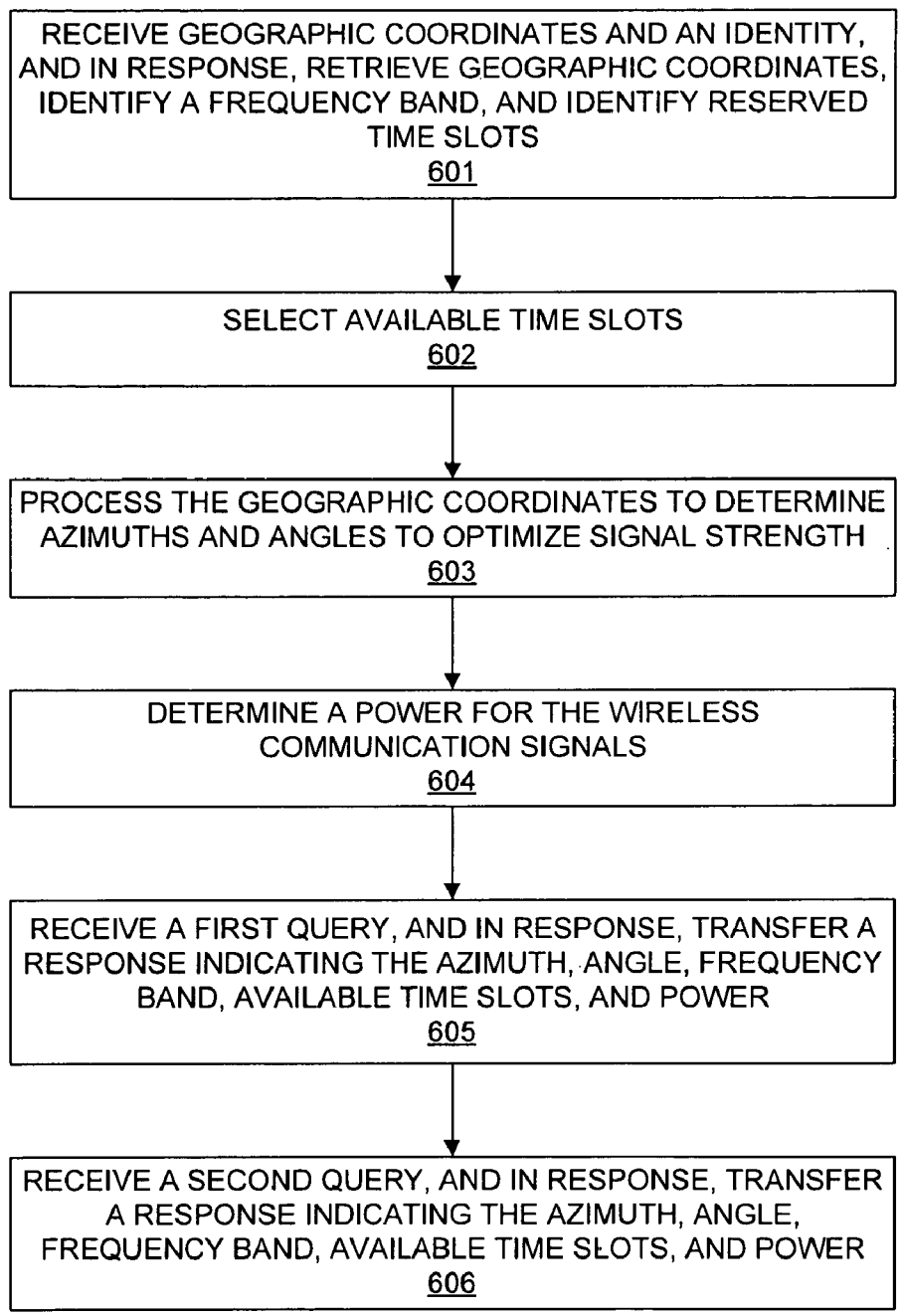
FIG. 6 is a flow diagram illustrating a method of operating a wireless communication system.

FIG. 6 is a flow diagram illustrating a method of operating a wireless communication system, such as the wireless communication systems illustrated in FIGS. 1-5. In the wireless communication systems illustrated in FIGS. 1-5, wireless users and a wireless access hub will exchange user data over wireless communication signals. Likewise, the wireless access hub and a wireless collector hub will then exchange the user data over wireless communication signals and the wireless collector hub and a core hub will exchange the user data over wireless communication signals. The user data exchanged over wireless communication signals may be in the form of one of the multitude of data formats currently available for transmission over wireless communication networks, such as voice, Internet, or video. Controller 130, core hub 101, collector hub 105, and access hub 201 from FIGS. 1 and 2 will be used to illustrate an example of the method of operating a wireless communication system illustrated in FIG. 6.

In step 601, controller 130 receives geographic coordinates for access hub 201 and an identity of collector hub 105. In response, controller 130 retrieves geographic coordinates for collector hub 105, identifies a frequency band for the wireless communication signals between the core hub 101 and collector hub 105, and identifies a reserved time slots in the frequency band at collector hub 105. The geographic coordinates received by controller 130 may be in the form of Global Positioning System (GPS) coordinates; however, other types of coordinates may be used. The reserved time slots identified by controller 130 may be comprised of multiple time slots. For example, the reserved timeslot may comprise two discrete time slots where during one of the discrete time slots wireless communication signals are transmitted from access hub 201 to collector hub 105 and where during the other discrete time slot wireless communication signals are transmitted form collector hub 105 to access hub 201. The frequency band identified by controller 130 is typically comprised of the microwave frequency band, although, other frequency bands may be used.

In step 602, controller 130 selects available time slots in the frequency band at collector hub 105 for the wireless communications signals between collector hub 105 and access hub 201. In step 603, controller 130 processes the geographic coordinates to determine an azimuth and an angle for access hub 201 and an azimuth and an angle for collector hub 105 to optimize signal strength for the wireless communication signals between access hub 201 and collector hub 105. In step 604, controller 130 determines a power for the wireless communications signals between collector hub 105 and access hub 201 based on the distance between collector hub 105 and access hub 201.

In step 605, controller 130 receives a query for access hub 201, and in response, transfers a response indicating the azimuth, the angle, the frequency band, the available time slots, and the power. In step 606, controller 130 receives another query for collector hub 105, and in response, transfers a response indicating the azimuth, the angle, the frequency band, the available time slots, and the power.

In the above example, hub 101 and 201 would transfer the above queries when they are configured to communicate with one another. Hubs 101 and 201 would receive and implement the above responses. For example, collector hub 105 would transmit to and receive from access hub 201 using the frequency, time slots, azimuth, angle, and power indicated in the response from controller 130. Likewise, access hub 201 would transmit to and receive from collector hub 105 using the frequency, time slots, azimuth, angle, and power indicated in the response from controller 130. Hubs 105 and 201 could use beam forming technology to transmit at the proper azimuths.

Figure 7:
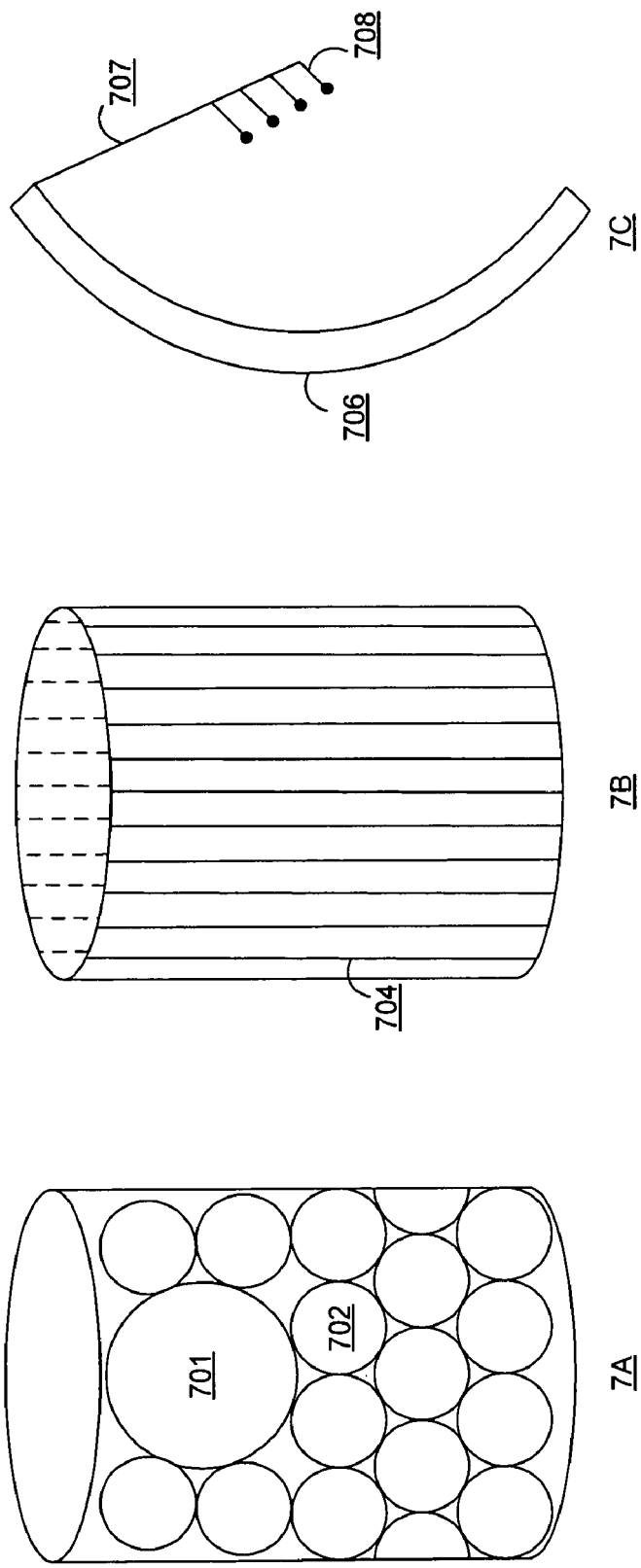
FIG. 7 is a side view of antenna structures 7A, 7B, and 7C.

FIG. 7 is a side view of three different antenna structures that may be used as the antennas found in collector hubs 102-107 and 401 in FIGS. 1, 2, and 4. Antenna 7A is an example of a stacked antenna element array. A stacked element antenna array is comprised of multiple parabolic dish-type antenna elements which enable multiple point to point links from a single antenna structure. Additionally, individual antenna elements are stacked and off set which enables multiple simultaneous point to point paths from a single array. Antenna 7A is comprised of many smaller antennas, for example antenna 702, and one large antenna, antenna 701. Antenna 701 transfers communications between a collector hub and a core hub, such as collector hub 105 and core hub 101, while antenna 702 transfers communications between a collector hub and multiple access hubs, such as collector hub 105 and access hubs 201-204.

Antenna 7B is an example of an antenna array. Antenna 7B is comprised of metal bars, such as metal bar 704, attached to a top and bottom metal cylinder. Antenna 7B is also comprised of metallic reflectors, one for each antenna bar element, which are shaped as half cylinders that are positioned behind each antenna bar element. The metallic reflectors serve to increase the gain of the communication signals transmitted by each antenna bar element away from the center of the antenna array and towards the destination of the signal.

Antenna 7C is an example of a parabolic antenna. Antenna 7C is comprised of reflector 706, support 707, and multiple antenna feeds, such as antenna feed 708. The multiple antenna feeds allow for multiple simultaneous point to point paths from a single reflector. The structure of antenna 7C could be integrated into the antenna structure of antenna 7A.

Note that communication systems 100-500 enable high bandwidth backhaul transmission between cellular sites and the centralized core network, data networks, and video content servers. Additionally, communication systems 100-500 comprise an all wireless (or nearly all wireless) cellular backhaul network. Furthermore, through the use of beam forming antennas, communication systems 100-500 are able provide optimized signal strength between wireless access hubs and wireless collector hubs as well as being able to provide the ability to adjust in an economical manner for addition and/or removal of wireless access hubs. Controller 130 effectively provides a way to control a wireless communication system, such as communication systems 100-500.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a control database for a wireless communication system, wherein wireless users and a wireless access hub will exchange user data over first wireless communication signals, wherein the wireless access hub and a wireless collector hub will exchange the user data over second wireless communication signals, and wherein the wireless collector hub and a core communication network will exchange the user data over third wireless communication signals, the method comprising:
- receiving first geographic coordinates for the wireless access hub and an identity of the wireless collector hub and, in response, retrieving second geographic coordinates for the wireless collector hub, identifying a frequency band for the third wireless communication signals between the core communication network and the wireless collector hub, and identifying reserved time slots in the frequency band at the wireless collector hub;
- selecting available time slots in the frequency band at the wireless collector hub for the second wireless communications signals between the wireless collector hub and the wireless access hub;
- processing the first geographic coordinates and the second geographic coordinates to determine a first azimuth and a first angle for the wireless access hub and a second azimuth and a second angle for the wireless collector hub to optimize signal strength for the second wireless communication signals between the wireless access hub and the wireless collector hub;
- determining a power for the second wireless communications signals between the wireless collector hub and the wireless access hub based on a distance between the wireless collector hub and the wireless access hub; and
- receiving a first query for the wireless access hub, and in response, transferring a first response indicating the first azimuth, the first angle, the frequency band, the available time slots, and the power; and
- receiving a second query for the wireless collector hub, and in response, transferring a second response indicating the second azimuth, the second angle, the frequency band, the available time slots, and the power.

2. The method of operating the control database for the wireless communication system of claim 1 wherein the first geographic coordinates and the second geographic coordinates comprise Global Positioning System (GPS) coordinates.

3. The method of operating the control database for the wireless communication system of claim 1 wherein the time slots comprise a first time slot to transmit the second wireless communication signals from the wireless access hub to the wireless collector hub and a second time slot to transmit the second wireless communication signals from the wireless collector hub to the wireless access hub.

4. The method of operating the control database for the wireless communication system of claim 1 wherein the frequency band comprises a microwave frequency band.

5. The method of operating the control database for the wireless communication system of claim 1 wherein the user data comprises voice.

6. The method of operating the control database for the wireless communication system of claim 1 wherein the user data comprises Internet.

7. The method of operating the control database for the wireless communication system of claim 1 wherein the user data comprises video.

8. The method of operating the control database for the wireless communication system of claim 1 wherein the time slots comprise a first time slot to transmit the second wireless communication signals from the wireless access hub to the wireless collector hub and a second time slot to transmit the second wireless communication signals from the wireless collector hub to the wireless access hub and wherein the frequency band comprises a microwave frequency band.

9. The method of operating the control database for the wireless communication system of claim 1 wherein the first geographic coordinates and the second geographic coordinates comprise Global Positioning System (GPS) coordinates and wherein the user data comprises voice, Internet, or video.

10. The method of operating the control database for the wireless communication system of claim 1 wherein the frequency band comprises a common-carrier microwave frequency band.

11. A wireless communication system for operating a control database, the wireless communication system comprising:
- a wireless access hub, wherein wireless users and the wireless access hub exchange user data over first wireless communication signals,
- a wireless collector hub, wherein the wireless access hub and the wireless collector hub exchange the user data over second wireless communication signals,
- a core communication network, wherein the wireless collector hub and the core communication network exchange the user data over third wireless communication signals, and
- the control database configured to receive first geographic coordinates for the wireless access hub and an identity of the wireless collector hub and, in response, retrieve second geographic coordinates for the wireless collector hub, identify a frequency band for the third wireless communication signals between the core communication network and the wireless collector hub, and identify reserved time slots in the frequency band at the wireless collector hub;
- the control database further configured to select available time slots in the frequency band at the wireless collector hub for the second wireless communications signals between the wireless collector hub and the wireless access hub, process the first geographic coordinates and the second geographic coordinates to determine a first azimuth and a first angle for the wireless access hub and a second azimuth and a second angle for the wireless collector hub to optimize signal strength for the second wireless communication signals between the wireless access hub and the wireless collector hub, determine a power for the second wireless communications signals between the wireless collector hub and the wireless access hub based on a distance between the wireless collector hub and the wireless access hub, receive a first query for the wireless access hub, and in response, transfer a first response indicating the first azimuth, the first angle, the frequency band, the available time slots, and the power, and receive a second query for the wireless collector hub, and in response, transfer a second response indicating the second azimuth, the second angle, the frequency band, the available time slots, and the power.

12. The wireless communication system for operating the control database of claim 11 wherein the first geographic coordinates and the second geographic coordinates comprise Global Positioning System (GPS) coordinates.

13. The wireless communication system for operating the control database of claim 11 wherein the time slots comprise a first time slot to transmit the second wireless communication signals from the wireless access hub to the wireless collector hub and a second time slot to transmit the second wireless communication signals from the wireless collector hub to the wireless access hub.

14. The wireless communication system for operating the control database of claim 11 wherein the frequency band comprises a microwave frequency band.

15. The wireless communication system for operating the control database of claim 11 wherein the user data comprises voice.

16. The wireless communication system for operating the control database of claim 11 wherein the user data comprises Internet.

17. The wireless communication system for operating the control database of claim 11 wherein the user data comprises video.

18. The wireless communication system for operating the control database of claim 11 wherein the time slots comprise a first time slot to transmit the second wireless communication signals from the wireless access hub to the wireless collector hub and a second time slot to transmit the second wireless communication signals from the wireless collector hub to the wireless access hub and wherein the frequency band comprises a microwave frequency band.

19. The wireless communication system for operating the control database of claim 11 wherein the first geographic coordinates and the second geographic coordinates comprise Global Positioning System (GPS) coordinates and wherein the user data comprises voice, Internet, or video.

20. The wireless communication system for operating the control database of claim 11 wherein the frequency band comprises a common-carrier microwave frequency band.

* * * * *